United States Patent [19]

Nakagawa et al.

[11] Patent Number: 5,939,044
[45] Date of Patent: Aug. 17, 1999

[54] ZEOLITE SSZ-36

[75] Inventors: Yumi Nakagawa, Oakland; Susan T. Evans, Mountain View; Gregory S. Lee, San Ramon; Stacey I. Zones, San Francisco, all of Calif.

[73] Assignee: Chevron U.S.A. Inc., San Francisco, Calif.

[21] Appl. No.: 08/988,838

[22] Filed: Dec. 11, 1997

Related U.S. Application Data

[60] Provisional application No. 60/034,252, Dec. 31, 1996.

[51] Int. Cl.$^6$ .............................. C01B 39/48; C01B 39/12
[52] U.S. Cl. ..................... 423/706; 423/712; 423/713; 423/718
[58] Field of Search ..................... 423/706, 713, 423/718, 712

[56] References Cited

U.S. PATENT DOCUMENTS

| | | | |
|---|---|---|---|
| 4,544,538 | 10/1985 | Zones | 423/706 |
| 4,859,442 | 8/1989 | Zones et al. . | |
| 5,187,132 | 2/1993 | Zones et al. | 502/64 |
| 5,268,161 | 12/1993 | Nakagawa | 423/706 |
| 5,316,753 | 5/1994 | Nakagawa | 423/706 |
| 5,340,563 | 8/1994 | Zones et al. | 423/706 |
| 5,580,540 | 12/1996 | Nakagawa | 423/718 |
| 5,614,166 | 3/1997 | Gies et al. | 423/706 |
| 5,645,812 | 7/1997 | Nakagawa | 423/706 |
| 5,785,947 | 7/1998 | Zones et al. | 423/706 |

*Primary Examiner*—Mark L. Bell
*Assistant Examiner*—David Sample
*Attorney, Agent, or Firm*—Richard J. Sheridan

[57] ABSTRACT

The present invention relates to new crystalline zeolite SSZ-36 prepared using a cyclic or polycyclic quaternary ammonium cation templating agent.

8 Claims, No Drawings

ZEOLITE SSZ-36

This application claims the benefit of provisional application Ser. No. 60/034252, filed Dec. 31, 1996.

BACKGROUND OF THE INVENTION

1. Field of the Invention

The present invention relates to new crystalline zeolite SSZ-36, a method for preparing SSZ-36 using a variety of cyclic or polycyclic quaternary ammonium cation templating agents, and processes employing SSZ-36 as a catalyst.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "zeolite SSZ-36" or simply "SSZ-36". Preferably, SSZ-36 is obtained in its silicate, aluminosilicate, titanosilicate, vanadosilicate or borosilicate form. The term "silicate" refers to a zeolite having a high mole ratio of silicon oxide relative to aluminum oxide, preferably a mole ratio greater than 100. As used herein, the term "aluminosilicate" refers to a zeolite containing both alumina and silica and the term "borosilicate" refers to a zeolite containing oxides of both boron and silicon.

In accordance with this invention, there is also provided a zeolite having a mole ratio greater than about 15 of an oxide of a first tetravalent element to an oxide of a second tetravalent element different from said first tetravalent element, trivalent element, pentavalent element or mixture thereof and having, after calcination, the X-ray diffraction lines of Table II.

Further, in accordance with this invention, there is provided a zeolite having a mole ratio greater than about 15 of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof and having, after calcination, the X-ray diffraction lines of Table II below.

The present invention further provides such a zeolite having a composition, as synthesized and in the anhydrous state, in terms of mole ratios as follows:

| | |
|---|---|
| $YO_2/W_cO_d$ | 15–100 |
| $M_{2/n}YO_2$ | 0.01–0.10 |
| $Q/YO_2$ | 0.02–0.08 | wherein Y is silicon, germanium or a mixture thereof; W is aluminum, gallium, iron, boron, titanium, indium, vanadium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof; n is the valence of M (i.e., 1 or 2); and Q is at least one cyclic or polycyclic quaternary ammonium cation.

In accordance with this invention, there is also provided a zeolite prepared by thermally treating a zeolite having a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 15 at a temperature of from about 200° C. to about 800° C., the thus-prepared zeolite having the X-ray diffraction lines of Table II. The present invention also includes this thus-prepared zeolite which is predominantly in the hydrogen form, which hydrogen form is prepared by ion exchanging with an acid or with a solution of an ammonium salt followed by a second calcination.

Also provided in accordance with the present invention is a method of preparing a crystalline material comprising an oxide of a first tetravalent element and an oxide of a second tetravalent element which is different from said first tetravalent element, trivalent element, pentavalent element or mixture thereof, said method comprising contacting under crystallization conditions sources of said oxides and a templating agent comprising a cyclic or polycyclic quaternary ammonium cation.

The present invention additionally provides a process for converting hydrocarbons comprising contacting a hydrocarbonaceous feed at hydrocarbon converting conditions with a catalyst comprising the zeolite of this invention. The zeolite may be predominantly in the hydrogen form. It may also be substantially free of acidity.

Further provided by the present invention is a hydrocracking process comprising contacting a hydrocarbon feedstock under hydrocracking conditions with a catalyst comprising the zeolite of this invention, preferably predominantly in the hydrogen form.

This invention also includes a dewaxing process comprising contacting a hydrocarbon feedstock under dewaxing conditions with a catalyst comprising the zeolite of this invention, preferably predominantly in the hydrogen form.

The present invention also includes a process for improving the viscosity index of a dewaxed product of waxy hydrocarbon feeds comprising contacting the waxy hydrocarbon feed under isomerization dewaxing conditions with a catalyst comprising the zeolite of this invention, preferably predominantly in the hydrogen form.

The present invention further includes a process for producing a $C_{20+}$ lube oil from a $C_{20+}$ olefin feed comprising isomerizing said olefin feed under isomerization conditions over a catalyst comprising at least one Group VIII metal and the zeolite of this invention. The zeolite may be predominantly in the hydrogen form.

In accordance with this invention, there is also provided a process for catalytically dewaxing a hydrocarbon oil feedstock boiling above about 350° F. and containing straight chain and slightly branched chain hydrocarbons comprising contacting said hydrocarbon oil feedstock in the presence of added hydrogen gas at a hydrogen pressure of about 15–3000 psi with a catalyst comprising at least one Group VIII metal and the zeolite of this invention, preferably predominantly in the hydrogen form. The catalyst may be a layered catalyst comprising a first layer comprising at least one Group VIII metal and the zeolite of this invention, and a second layer comprising an aluminosilicate zeolite which is more shape selective than the zeolite of said first layer.

Also included in the present invention is a process for preparing a lubricating oil which comprises hydrocracking in a hydrocracking zone a hydrocarbonaceous feedstock to obtain an effluent comprising a hydrocracked oil, and catalytically dewaxing said effluent comprising hydrocracked oil at a temperature of at least about 400° F. and at a pressure of from about 15 psig to about 3000 psig in the presence of added hydrogen gas with a catalyst comprising at least one Group VIII metal and the zeolite of this invention. The zeolite may be predominantly in the hydrogen form.

Further included in this invention is a process for isomerization dewaxing a raffinate comprising contacting said raffinate in the presence of added hydrogen with a catalyst comprising at least one Group VIII metal and the zeolite of this invention. The raffinate may be bright stock, and the zeolite may be predominantly in the hydrogen form.

Also included in this invention is a process for increasing the octane of a hydrocarbon feedstock to produce a product having an increased aromatics content comprising contacting a hydrocarbonaceous feedstock which comprises normal and slightly branched hydrocarbons having a boiling range above about 40° C. and less than about 200° C., under aromatic conversion conditions with a catalyst comprising the zeolite of this invention made substantially free of acidity by neutralizing said zeolite with a basic metal. Also provided in this invention is such a process wherein the zeolite contains a Group VIII metal component.

Also provided by the present invention is a catalytic cracking process comprising contacting a hydrocarbon feedstock in a reaction zone under catalytic cracking conditions in the absence of added hydrogen with a catalyst comprising the zeolite of this invention, preferably predominantly in the hydrogen form. Also included in this invention is such a catalytic cracking process wherein the catalyst additionally comprises a large pore crystalline cracking component.

Further provided by this invention is a process to convert paraffins to aromatics which comprises contacting paraffins under conditions which cause paraffins to convert to aromatics with a catalyst comprising the zeolite of this invention, said catalyst comprising gallium, zinc, or a compound of gallium or zinc.

Further provided in accordance with this invention is a process for isomerizing an isomerization feed comprising an aromatic $C_8$ stream of xylene isomers or mixtures of xylene isomers and ethylbenzene, wherein a more nearly equilibrium ratio of ortho-, meta- and para-xylenes is obtained, said process comprising contacting said feed under isomerization conditions with a catalyst comprising the zeolite of this invention.

The present invention further provides a process for oligomerizing olefins comprising contacting an olefin feed under oligomerization conditions with a catalyst comprising the zeolite of this invention.

There is further provided in accordance with this invention a process for isomerizing olefins comprising contacting an olefin feed under isomerization conditions with a catalyst comprising the zeolite of this invention.

Further provided in accordance with this invention is a process for the production of higher molecular weight hydrocarbons from lower molecular weight hydrocarbons comprising the steps of:

(a) introducing into a reaction zone a lower molecular weight hydrocarbon-containing gas and contacting said gas in said zone under $C_{2+}$ hydrocarbon synthesis conditions with a catalyst comprising the zeolite of this invention and a metal or metal compound capable of converting the lower molecular weight hydrocarbon to a higher molecular weight hydrocarbon; and (b) withdrawing from said reaction zone a higher molecular weight hydrocarbon-containing stream. Preferably, the metal or metal compound is a lanthanide or actinide metal or metal compound and the lower molecular weight hydrocarbon is methane.

This invention also provides a process for converting lower alcohols and other oxygenated hydrocarbons comprising contacting said lower alcohol or other oxygenated hydrocarbon with a catalyst comprising the zeolite of this invention under conditions to produce liquid products.

Also provided by the present invention is an improved process for the reduction of oxides of nitrogen contained in a gas stream in the presence of oxygen wherein said process comprises contacting the gas stream with a zeolite, the improvement comprising using as the zeolite the zeolite of this invention. The zeolite may contain a metal or metal ions (such as cobalt, copper or mixtures thereof) capable of catalyzing the reduction of the oxides of nitrogen, and may be conducted in the presence of a stoichiometric excess of oxygen. In a preferred embodiment, the gas stream is the exhaust stream of an internal combustion engine.

Also provided in accordance with this invention is a process for the separation of nitrogen from a nitrogen-containing gas mixture comprising contacting the mixture with a composition comprising the zeolite of this invention. In a preferred embodiment, the gas mixture contains nitrogen and methane.

DETAILED DESCRIPTION OF THE INVENTION

The present invention comprises a family of crystalline, constrained pore zeolites designated herein "zeolite SSZ-36" or simply "SSZ-36". As used herein, the term "constrained pore" means having an average pore size diameter less than about 6.0 Angstroms, preferably from about 4.0 Angstroms to about 6.0 Angstroms.

In preparing SSZ-36 zeolites, a cyclic or polycyclic quaternary ammonium cation is used as a crystallization template. In general, SSZ-36 is prepared by contacting an active source of one or more oxides selected from the group consisting of monovalent element oxides, divalent element oxides, trivalent element oxides, and tetravalent element oxides with the cyclic or polycyclic quaternary ammonium cation templating agent.

SSZ-36 is prepared from a reaction mixture having the composition shown in Table A below.

TABLE A

| | Reaction Mixture | |
|---|---|---|
| | Typical | Preferred |
| $YO_2/W_aO_b$ | 15–70 | 30–50 |
| $OH^-/YO_2$ | 0.20–0.40 | 0.20–0.30 |

TABLE A-continued

Reaction Mixture

|  | Typical | Preferred |
|---|---|---|
| Q/YO$_2$ | 0.10–0.40 | 0.10–0.20 |
| M$_{2/n}$/YO$_2$ | 0.01–0.10 | 0.03–0.07 |
| H$_2$O/YO$_2$ | 20–50 | 30–45 | where Y, W, Q, M and n are as defined above, and a is 1 or 2, and b is 2 when a is I (i.e., W is tetravalent) and b is 3 when a is 2 (i.e., W is trivalent).

In practice, SSZ-36 is prepared by a process comprising:
(a) preparing an aqueous solution containing sources of at least one oxide capable of forming a crystalline molecular sieve and a cyclic or polycyclic quaternary ammonium cation having an anionic counterion which is not detrimental to the formation of SSZ-36;
(b) maintaining the aqueous solution under conditions sufficient to form crystals of SSZ-36; and
(c) recovering the crystals of SSZ-36.

Accordingly, SSZ-36 may comprise the crystalline material and the templating agent in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a second tetravalent element(s) different from the first tetravalent element(s), trivalent element(s), pentavalent element(s) or mixture thereof The first tetravalent element(s) is preferably selected from the group consisting of silicon, germanium and combinations thereof. More preferably, the first tetravalent element is silicon. The second tetravalent element (which is different from the first tetravalent element), trivalent element and pentavalent element is preferably selected from the group consisting of aluminum, gallium, iron, boron, titanium, indium, vanadium and combinations thereof More preferably, the second trivalent or tetravalent element is aluminum or boron.

Typical sources of aluminum oxide for the reaction mixture include aluminates, alumina, aluminum colloids, aluminum oxide coated on silica sol, hydrated alumina gels such as Al(OH)$_3$ and aluminum compounds such as AlCl$_3$ and Al$_2$(SO$_4$)$_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, indium, vanadium and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 4,503,024 issued on Mar. 5, 1985 to Bourgogne et al. entitled "PROCESS FOR THE PREPARATION OF SYNTHETIC ZEOLITES, AND ZEOLITES OBTAINED BY SAID PROCESS", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-36 zeolite are formed. The hydrothermal crystallization is usually conducted under autogenous pressure, at a temperature between 100° C. and 200° C., preferably between 135° C. and 180° C. The crystallization period is typically greater than 1 day and preferably from about 3 days to about 20 days.

Preferably, the zeolite is prepared using mild stirring or agitation.

During the hydrothermal crystallization step, the SSZ-36 crystals can be allowed to nucleate spontaneously from the reaction mixture. The use of SSZ-36 crystals as seed material can be advantageous in decreasing the time necessary for complete crystallization to occur. In addition, seeding can lead to an increased purity of the product obtained by promoting the nucleation and/or formation of SSZ-36 over any undesired phases. When used as seeds, SSZ-36 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-36 zeolite crystals. The drying step can be performed at atmospheric pressure or under vacuum.

SSZ-36 as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 15; and has the X-ray diffraction lines of Table I below. SSZ-36 further has a composition, as synthesized and in the anhydrous state, in terms of mole ratios, shown in Table B below.

TABLE B

As-Synthesized SSZ-36

| YO$_2$/W$_c$O$_d$ | 15–100 |
|---|---|
| M$_{2/n}$/YO$_2$ | 0.01–0.05 |
| Q/YO$_2$ | 0.02–0.05 | where Y, W, c, d, Q, M and n are as defined above.

SSZ-36 can be made essentially aluminum free, i.e., having a silica to alumina mole ratio of ∞. A method of increasing the mole ratio of silica to alumina is by using standard acid leaching or chelating treatments. However, essentially aluminum-free SSZ-36 can be synthesized directly using essentially aluminum-free silicon sources as the main tetrahedral metal oxide component, if boron is also present. SSZ-36 can also be prepared directly as either an aluminosilicate or a borosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that SSZ-36 is comprised of a new framework structure or topology which is characterized by its X-ray diffraction pattern. SSZ-36 zeolites, as-synthesized, have a crystalline structure whose X-ray powder diffraction pattern exhibit the characteristic lines shown in Table I and is thereby distinguished from other known zeolites.

TABLE I

As-Synthesized SSZ-36

| 2 Theta[a] | d | Relative Intensity[b] |
|---|---|---|
| 8.6 | 10.3 | S |
| 9.0 | 9.81 | S |
| 10.1 | 8.75 | M-S |
| 17.3 | 5.12 | W |
| 18.3 | 4.84 | VS |
| 19.5 | 4.55 | W |
| 22.25 | 3.99 | W |
| 30.65 | 2.91 | W |

[a] ± 0.3
[b] The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

After calcination, the SSZ-36 zeolites have a crystalline structure whose X-ray powder diffraction pattern include the characteristic lines shown in Table II:

TABLE II

Calcined SSZ-36

| 2 Theta[a] | d | Relative Intensity |
|---|---|---|
| 8.6 | 10.3 | VS |
| 9.0 | 9.81 | VS |
| 10.1 | 8.75 | M-S |
| 17.3 | 5.12 | W |
| 18.3 | 4.84 | VS |
| 19.5 | 4.55 | W |
| 22.25 | 3.99 | W |
| 30.65 | 2.91 | W |

[a] ± 0.3

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.30 degrees.

The X-ray diffraction pattern of Table I is representative of "as-synthesized" or "as-made" SSZ-36 zeolites. Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-36 are shown in Table II. Calcination can also result in changes in the intensities of the peaks as compared to patterns of the "as-made" material, as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-36 can be used as-synthesized, but preferably will be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina mole ratio. The zeolite can also be steamed; steaming helps stabilize the crystalline lattice to attack from acids.

The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired.

Metals may also be introduced into the zeolite by replacing some of the cations in the zeolite with metal cations via standard ion exchange techniques (see, for example, U.S. Pat. Nos. 3,140,249 issued Jul. 7, 1964 to Plank et al.; 3,140,251 issued Jul. 7, 1964 to Plank et al.; and 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-36. The zeolite can also be impregnated with the metals, or, the metals can be physically and intimately admixed with the zeolite using standard methods known to the art.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. Nos. 3,140,249 issued on Jul. 7, 1964 to Plank et al.; 3,140,251 issued on Jul. 7, 1964 to Plank et al.; and 3,140,253 issued on Jul. 7, 1964 to Plank et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-36, the spatial arrangement of the atoms which form the basic crystal lattice of the zeolite remains essentially unchanged.

SSZ-36 can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

SSZ-36 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

Hydrocarbon Conversion Processes

SSZ-36 zeolites are useful in hydrocarbon conversion reactions. Hydrocarbon conversion reactions are chemical and catalytic processes in which carbon containing compounds are changed to different carbon containing compounds. Examples of hydrocarbon conversion reactions in which SSZ-36 are expected to be useful include hydrocracking, dewaxing, catalytic cracking and olefin and aromatics formation reactions. The catalysts are also expected to be useful in other petroleum refining and hydrocarbon conversion reactions such as isomerizing n-paraffins and naphthenes, isomerizing olefins, polymerizing and oligomerizing olefinic or acetylenic compounds such as isobutylene and butene-1, reforming, isomerizing polyalkyl substituted aromatics (e.g., m-xylene), disproportionating aromatics (e.g., toluene) to provide mixtures of benzene, xylenes and higher methylbenzenes, forming higher molecular weight hydrocarbons from lower molecular weight hydrocarbons (e.g., methane upgrading) and oxidation reactions. Also included are rearrangement reactions to make various naphthalene derivatives. The SSZ-36 catalysts may have high selectivity, and under hydrocarbon conversion conditions can provide a high percentage of desired products relative to total products.

SSZ-36 zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, synthetic paraffins from NAO, recycled plastic feedstocks and, in general, can be any carbon containing feedstock susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., a Group VIII metal such platinum, include hydrogenation-dehydrogenation reactions, denitrogenation and desulfurization reactions.

The following table indicates typical reaction conditions which may be employed when using catalysts comprising SSZ-36 in the hydrocarbon conversion reactions of this invention. Preferred conditions are indicated in parentheses.

| Process | Temp., ° C. | Pressure | LHSV |
|---|---|---|---|
| Hydrocracking | 175–485 | 0.5–350 bar | 0.1–30 |
| Dewaxing | 200–475 (250–450) | 15–3000 psig (200–3000) | 0.1–20 (0.2–10) |
| Aromatics formation | 400–600 (480–550) | atm.–10 bar | 0.1–15 |
| Cat. cracking | 127–885 | subatm.–[1] (atm.–5 atm.) | 0.5–50 |
| Oligomerization | 232–649[2] 10–232[4] (27–204)[4] | 0.1–50 atm.[2,3] — — | 0.2–50[2] 0.05–20[5] (0.1–10)[5] |
| Paraffins to aromatics | 100–700 | 0–1000 psig | 0.5–40[5] |
| Condensation of alcohols | 260–538 | 0.5–1000 psig | 0.5–50[5] |
| Isomerization | 93–538 (204–315) | 50–1000 psig | 1–10 (1–4) |
| Xylene isomerization | 260–593[2] (315–566)[2] 38–371[4] | 0.5–50 atm.[2] (1–5 atm)[2] 1–200 atm.[4] | 0.1–100[5] (0.5–50)[5] 0.5–50 |

[1] Several hundred atmospheres
[2] Gas phase reaction
[3] Hydrocarbon partial pressure
[4] Liquid phase reaction
[5] WHSV Other reaction conditions and parameters are provided below.

Hydrocracking

Using a catalyst which comprises SSZ-36, preferably predominantly in the hydrogen form, and a hydrogenation promoter, heavy petroleum residual feedstocks, cyclic stocks and other hydrocrackate charge stocks can be hydrocracked using the process conditions and catalyst components disclosed in the aforementioned U.S. Pat. No. 4,910,006 and U.S. Pat. No. 5,316,753.

The hydrocracking catalysts contain an effective amount of at least one hydrogenation component of the type commonly employed in hydrocracking catalysts. The hydrogenation component is generally selected from the group of hydrogenation catalysts consisting of one or more metals of Group VIB and Group VIII, including the salts, complexes and solutions containing such. The hydrogenation catalyst is preferably selected from the group of metals, salts and complexes thereof of the group consisting of at least one of platinum, palladium, rhodium, iridium, ruthenium and mixtures thereof or the group consisting of at least one of nickel, molybdenum, cobalt, tungsten, titanium, chromium and mixtures thereof Reference to the catalytically active metal or metals is intended to encompass such metal or metals in the elemental state or in some form such as an oxide, sulfide, halide, carboxylate and the like. The hydrogenation catalyst is present in an effective amount to provide the hydrogenation function of the hydrocracking catalyst, and preferably in the range of from 0.05 to 25% by weight.

Dewaxing

SSZ-36, preferably predominantly in the hydrogen form, can be used to dewax hydrocarbonaceous feeds by selectively removing straight chain paraffins. Typically, the viscosity index of the dewaxed product is improved (compared to the waxy feed) when the waxy feed is contacted with SSZ-36 under isomerization dewaxing conditions.

The catalytic dewaxing conditions are dependent in large measure on the feed used and upon the desired pour point. Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone. Typical feedstocks include light gas oil, heavy gas oils and reduced crudes boiling above about 350° F.

A typical dewaxing process is the catalytic dewaxing of a hydrocarbon oil feedstock boiling above about 350° F. and containing straight chain and slightly branched chain hydrocarbons by contacting the hydrocarbon oil feedstock in the presence of added hydrogen gas at a hydrogen pressure of about 15–3000 psi with a catalyst comprising SSZ-36 and at least one Group VIII metal.

The SSZ-36 hydrodewaxing catalyst may optionally contain a hydrogenation component of the type commonly employed in dewaxing catalysts. See the aforementioned U.S. Pat. No. 4,910,006 and U.S. Pat. No. 5,316,753 for examples of these hydrogenation components.

The hydrogenation component is present in an effective amount to provide an effective hydrodewaxing and hydroisomerization catalyst preferably in the range of from about 0.05 to 5% by weight. The catalyst may be run in such a mode to increase isodewaxing at the expense of cracking reactions.

The feed may be hydrocracked, followed by dewaxing. This type of two stage process and typical hydrocracking conditions are described in U.S. Pat. No. 4,921,594, issued May 1, 1990 to Miller, which is incorporated herein by reference in its entirety.

SSZ-36 may also be utilized as a dewaxing catalyst in the form of a layered catalyst. That is, the catalyst comprises a first layer comprising zeolite SSZ-36 and at least one Group VIII metal, and a second layer comprising an aluminosilicate zeolite which is more shape selective than zeolite SSZ-36. The use of layered catalysts is disclosed in U.S. Pat. No. 5,149,421, issued Sep. 22, 1992 to Miller, which is incorporated by reference herein in its entirety. The layering may also include a bed of SSZ-36 layered with a non-zeolitic component designed for either hydrocracking or hydrofinishing.

SSZ-36 may also be used to dewax raffinates, including bright stock, under conditions such as those disclosed in U.S. Pat. No. 4,181,598, issued Jan. 1, 1980 to Gillespie et al., which is incorporated by reference herein in its entirety.

It is often desirable to use mild hydrogenation (sometimes referred to as hydrofinishing) to produce more stable dewaxed products. The hydrofinishing step can be performed either before or after the dewaxing step, and preferably after. Hydrofinishing is typically conducted at temperatures ranging from about 190° C. to about 340° C. at pressures from about 400 psig to about 3000 psig at space velocities (LHSV) between about 0.1 and 20 and a hydrogen recycle rate of about 400 to 1500 SCF/bbl. The hydrogenation catalyst employed must be active enough not only to hydrogenate the olefins, diolefins and color bodies which may be present, but also to reduce the aromatic content. Suitable hydrogenation catalyst are disclosed in U.S. Pat. No. 4,921, 594, issued May 1, 1990 to Miller, which is incorporated by reference herein in its entirety. The hydrofinishing step is beneficial in preparing an acceptably stable product (e.g., a lubricating oil) since dewaxed products prepared from hydrocracked stocks tend to be unstable to air and light and tend to form sludges spontaneously and quickly.

Lube oil may be prepared using SSZ-36. For example, a $C_{20+}$ lube oil may be made by isomerizing a $C_{20+}$ olefin feed over a catalyst comprising SSZ-36 in the hydrogen form and at least one Group VIII metal. Alternatively, the lubricating oil may be made by hydrocracking in a hydrocracking zone a hydrocarbonaceous feedstock to obtain an effluent comprising a hydrocracked oil, and catalytically dewaxing the effluent at a temperature of at least about 400° F. and at a pressure of from about 15 psig to about 3000 psig in the presence of added hydrogen gas with a catalyst comprising SSZ-36 in the hydrogen form and at least one Group VIII metal.

Aromatics Formation

SSZ-36 can be used to convert light straight run naphthas and similar mixtures to highly aromatic mixtures. Thus, normal and slightly branched chained hydrocarbons, preferably having a boiling range above about 40° C. and less than about 200° C., can be converted to products having a substantial higher octane aromatics content by contacting the hydrocarbon feed with a catalyst comprising SSZ-36. It is also possible to convert heavier feeds into BTX or naphthalene derivatives of value using a catalyst comprising SSZ-36.

The conversion catalyst preferably contains a Group VIII metal compound to have sufficient activity for commercial use. By Group VIII metal compound as used herein is meant the metal itself or a compound thereof The Group VIII noble metals and their compounds, platinum, palladium, and iridium, or combinations thereof can be used. Rhenium or tin or a mixture thereof may also be used in conjunction with the Group VIII metal compound and preferably a noble metal compound. The most preferred metal is platinum. The amount of Group VIII metal present in the conversion catalyst should be within the normal range of use in reforming catalysts, from about 0.05 to 2.0 weight percent, preferably 0.2 to 0.8 weight percent.

It is critical to the selective production of aromatics in useful quantities that the conversion catalyst be substantially free of acidity, for example, by neutralizing the zeolite with a basic metal, e.g., alkali metal, compound. Methods for rendering the catalyst free of acidity are known in the art. See the aforementioned U.S. Pat. No. 4,910,006 and U.S. Pat. No. 5,316,753 for a description of such methods.

The preferred alkali metals are sodium, potassium, rubidium and cesium. The zeolite itself can be substantially free of acidity only at very high silica:alumina mole ratios.

Catalytic Cracking

Hydrocarbon cracking stocks can be catalytically cracked in the absence of hydrogen using SSZ-36, preferably predominantly in the hydrogen form.

When SSZ-36 is used as a catalytic cracking catalyst in the absence of hydrogen, the catalyst may be employed in conjunction with traditional cracking catalysts, e.g., any aluminosilicate heretofore employed as a component in cracking catalysts. Typically, these are large pore, crystalline aluminosilicates. Examples of these traditional cracking catalysts are disclosed in the aforementioned U.S. Pat. No. 4,910,006 and U.S. Pat. No. 5,316,753. When a traditional cracking catalyst (TC) component is employed, the relative weight ratio of the TC to the SSZ-36 is generally between about 1: 10 and about 500:1, desirably between about 1:10 and about 200:1, preferably between about 1:2 and about 50: 1, and most preferably is between about 1: 1 and about 20: 1. The novel zeolite and/or the traditional cracking component may be further ion exchanged with rare earth ions to modify selectivity.

The cracking catalysts are typically employed with an inorganic oxide matrix component. See the aforementioned U.S. Pat. No. 4,910,006 and U.S. Pat. No. 5,316,753 for examples of such matrix components.

Conversion of Paraffins to Aromatics

SSZ-36 can be used to convert light gas $C_2$–$C_6$ paraffins to higher molecular weight hydrocarbons including aromatic compounds. Preferably, the zeolite will contain a catalyst metal or metal oxide wherein said metal is selected from the group consisting of Groups IB, IIB, VIII (especially platinum) and IIIA of the Periodic Table. Preferably, the metal is gallium, niobium, indium or zinc in the range of from about 0.05 to 5% by weight.

Xylene Isomerization

SSZ-36 may also be useful in a process for isomerizing one or more xylene isomers in a $C_8$ aromatic feed to obtain ortho-, meta-, and para-xylene in a ratio approaching the equilibrium value. In particular, xylene isomerization is used in conjunction with a separate process to manufacture para-xylene. For example, a portion of the para-xylene in a mixed $C_8$ aromatics stream may be recovered by crystallization and centrifugation. The mother liquor from the crystallizer is then reacted under xylene isomerization conditions to restore ortho-, meta- and para-xylenes to a near equilibrium ratio. At the same time, part of the ethylbenzene in the mother liquor is converted to xylenes or to products which are easily separated by filtration. The isomerate is blended with fresh feed and the combined stream is distilled to remove heavy and light by-products. The resultant $C_8$ aromatics stream is then sent to the crystallizer to repeat the cycle.

Optionally, isomerization in the vapor phase is conducted in the presence of 3.0 to 30.0 moles of hydrogen per mole of alkylbenzene (e.g., ethylbenzene). If hydrogen is used, the catalyst should comprise about 0.1 to 2.0 wt % of a hydrogenation/dehydrogenation component selected from Group VIII (of the Periodic Table) metal component, especially platinum or nickel. By Group VIII metal component is meant the metals and their compounds such as oxides and sulfides.

Optionally, the isomerization feed may contain 10 to 90 wt % of a diluent such as toluene, trimethylbenzene, naphthenes or paraffins.

Oligomerization

It is expected that SSZ-36 can also be used to oligomerize straight and branched chain olefins having from about 2 to 21 and preferably 2–5 carbon atoms. The oligomers which are the products of the process are medium to heavy olefins which are useful for both fuels, i.e., gasoline or a gasoline blending stock and chemicals.

The oligomerization process comprises contacting the olefin feedstock in the gaseous or liquid phase with a catalyst comprising SSZ-36.

The zeolite can have the original cations associated therewith replaced by a wide variety of other cations according to techniques well known in the art. Typical cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. One of the prime requisites is that the zeolite have a fairly low aromatization activity, i.e., in which the amount of aromatics produced is not more than about 20% by weight. This is accomplished by using a zeolite with controlled acid activity [alpha value] of from about 0.1 to about 120, preferably from about 0.1 to about 100, as measured by its ability to crack n-hexane.

Alpha values are defined by a standard test known in the art, e.g., as shown in U.S. Pat. No. 3,960,978 issued on Jun. 1, 1976 to Givens et al. which is incorporated totally herein by reference. If required, such zeolites may be obtained by steaming, by use in a conversion process or by any other method which may occur to one skilled in this art.

Isomerization of Olefins

SSZ-36 can be used to isomerize olefins. The feed stream is a hydrocarbon stream containing at least one $C_{4-6}$ olefin, preferably a $C_{4-6}$ normal olefin, more preferably normal butene. Normal butene as used in this specification means all forms of normal butene, e.g., 1-butene, cis-2-butene, and trans-2-butene. Typically, hydrocarbons other than normal butene or other $C_{4-6}$ normal olefins will be present in the feed stream. These other hydrocarbons may include, e.g., alkanes, other olefins, aromatics, hydrogen, and inert gases.

The feed stream typically may be the effluent from a fluid catalytic cracking unit or a methyl-tert-butyl ether unit. A fluid catalytic cracking unit effluent typically contains about 40–60 weight percent normal butenes. A methyl-tert-butyl ether unit effluent typically contains 40-100 weight percent normal butene. The feed stream preferably contains at least about 40 weight percent normal butene, more preferably at least about 65 weight percent normal butene. The terms iso-olefin and methyl branched iso-olefin may be used interchangeably in this specification.

The process is carried out under isomerization conditions. The hydrocarbon feed is contacted in a vapor phase with a catalyst comprising the SSZ-36. The process may be carried out generally at a temperature from about 625° F. to about 950° F. (329–510° C.), for butenes, preferably from about 700° F. to about 900° F. (371–482° C.), and about 350° F. to about 650° F. (177–343° C.) for pentenes and hexenes. The pressure ranges from subatmospheric to about 200 psig, preferably from about 15 psig to about 200 psig, and more preferably from about 1 psig to about 150 psig.

The liquid hourly space velocity during contacting is generally from about 0.1 to about 50 $hr^{-1}$, based on the hydrocarbon feed, preferably from about 0.1 to about 20 $hr^{-1}$, more preferably from about 0.2 to about 10 $hr^{-1}$, most preferably from about 1 to about 5 $hr^{-1}$. A hydrogen/hydrocarbon molar ratio is maintained from about 0 to about 30 or higher. The hydrogen can be added directly to the feed stream or directly to the isomerization zone. The reaction is preferably substantially free of water, typically less than about two weight percent based on the feed. The process can be carried out in a packed bed reactor, a fixed bed, fluidized bed reactor, or a moving bed reactor. The bed of the catalyst can move upward or downward. The mole percent conversion of, e.g., normal butene to iso-butene is at least 10, preferably at least 25, and more preferably at least 35.

Methane Upgrading

Higher molecular weight hydrocarbons can be formed from lower molecular weight hydrocarbons by contacting the lower molecular weight hydrocarbon with a catalyst comprising SSZ-36 and a metal or metal compound capable of converting the lower molecular weight hydrocarbon to a higher molecular weight hydrocarbon. Examples of such reactions include the conversion of methane to $C_{2+}$ hydrocarbons such as ethylene or benzene or both. Examples of useful metals and metal compounds include lanthanide and or actinide metals or metal compounds.

These reactions, the metals or metal compounds employed and the conditions under which they can be run are disclosed in U.S. Pat. Nos. 4,734,537, issued Mar. 29, 1988 to Devries et al.; 4,939,311, issued Jul. 3, 1990 to Washecheck et al.; 4,962,261, issued Oct. 9, 1990 to Abrevaya et al.; 5,095,161, issued Mar. 10, 1992 to Abrevaya et al.; 5,105,044, issued Apr. 14, 1992 to Han et al.; 5,105,046, issued Apr. 14, 1992 to Washecheck; 5,238,898, issued Aug. 24, 1993 to Han et al.; 5,321,185, issued Jun. 14, 1994 to van der Vaart; and 5,336,825, issued Aug. 9, 1994 to Choudhary et al., each of which is incorporated herein by reference in its entirety.

Condensation of Alcohols

SSZ-36 can be used to condense lower aliphatic alcohols having 1 to 10 carbon atoms to a gasoline boiling point hydrocarbon product comprising mixed aliphatic and aromatic hydrocarbon. The process disclosed in U.S. Pat. No. 3,894,107, issued Jul. 8, 1975 to Butter et al., describes the process conditions used in this process, which patent is incorporated totally herein by reference.

The catalyst may be in the hydrogen form or may be base exchanged or impregnated to contain ammonium or a metal cation complement, preferably in the range of from about 0.05 to 5% by weight. The metal cations that may be present include any of the metals of the Groups I through VIII of the Periodic Table. However, in the case of Group IA metals, the cation content should in no case be so large as to effectively inactivate the catalyst, nor should the exchange be such as to eliminate all acidity. There may be other processes involving treatment of oxygenated substrates where a basic catalyst is desired.

Other Uses for SSZ-36

SSZ-36 can also be used as an adsorbent with high selectivities based on molecular sieve behavior and also based upon preferential hydrocarbon packing within the pores.

SSZ-36 may also be used for the catalytic reduction of the oxides of nitrogen in a gas stream. Typically, the gas stream also contains oxygen, often a stoichiometric excess thereof Also, the SSZ-36 may contain a metal or metal ions within or on it which are capable of catalyzing the reduction of the nitrogen oxides. Examples of such metals or metal ions include copper, cobalt and mixtures thereof One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

SSZ-36 may also be used in the separation of gases, such as the separation of nitrogen from a nitrogen-containing gas mixture. One example of such separation is the separation of nitrogen from methane (e.g., the separation of nitrogen from natural gas).

EXAMPLES

The following examples demonstrate but do not limit the present invention. The templating agents indicated in Table C below are used in these examples.

TABLE C

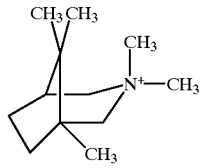

3,3-Dimethyl-1,8,8-trimethyl-3-azoniabicyclo[3.2.1.]octane
(Template A)

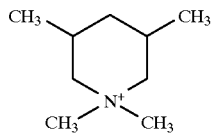

N,N-Dimethyl-3,5-dimethylpiperidinium cation
(Template B)

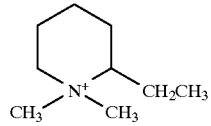

N,N-Dimethyl-2-ethylpiperidinium cation
(Template C)

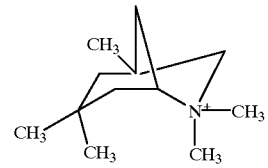

2,2,4,6,6-Pentamethyl-2-azoniabicyclo[3.2.1]octane cation
(Template D)

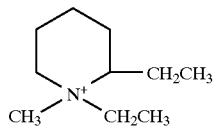

N-Ethyl-N-methyl-2-ethylpiperidinium cation
(Template E)

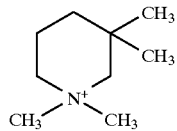

N,N-Dimethyl-3,3-dimethylpiperidinium cation
(Template F)

TABLE C-continued

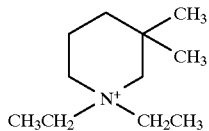

N,N-Diethyl-3,3-dimethylpiperidinium cation
(Template G)

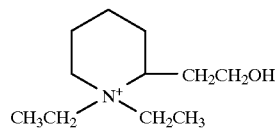

N,N-Diethyl-2-(2-hydroxyethyl)piperidinium cation
(Template H)

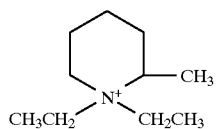

N,N-Diethyl-2-methylpiperidinium cation
(Template I)

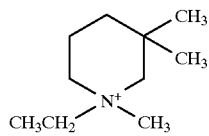

N-Ethyl-N-methyl-3,3-dimethylpiperidinium cation
(Template J)

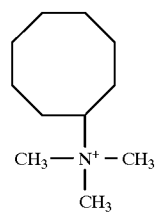

Trimethylammonium cyclooctane cation
(Template K)

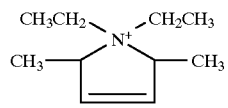

N,N-Dimethyl-2,5-dimethyl-2,5-dihydropyrrolium cation
(Template L)

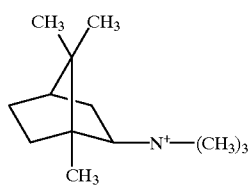

N,N,N-trimethyl-N-bornylammonium cation
(Template M)

The anion ($X^-$) associated with the cation may be any anion which is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

Example 1

The following reactants are combined: 6.23 grams of Template A, at 0.58M, is mixed with 0.6 gm of 1.0N NaOH, 5.04 grams of water and 0.143 gm of sodium tetraborate decahydrate. 0.924 Gram of Cabosil M-5 is added to the clear solution. The reaction is run in a 23 ml Parr 4745 reactor heated to 160° C. in a Blue M oven for a period of 18 days. The settled solids are washed and dried and upon work-up, produce a product which is analyzed by X-ray diffraction and found to be SSZ-36.

Example 2

Into 5.7 grams of water is added 3.91 grams of the template solution from Example 1, 2.25 grams of 1N KOH, and 0.102 gram of Reheis F2000 alumina hydrate (53% $Al_2O_3$). Upon clarification, 0.92 gram of Cabosil M-5 is added, the Parr reactor is closed and heated at 170° C. with 43 RPM tumbling in a Blue M oven for a period of 13 days. The crystallized product is an aluminosilicate version of SSZ-36.

Example 3

3.46 grams of a solution of Template B (0.72M) are used to dissolve 0.067 gram of sodium tetraborate decahydrate. 0.003 Gram of seeds of SSZ-36 from Example I are added, and finally 2.0 grams of Ludox AS-30 colloidal silica (30% $SiO_2$) are added into the solution in the Teflon cup of the Parr reactor. After 9 days at 160° C., without stirring, the reaction is complete. The X-ray diffraction pattern of the as-made SSZ-36 is given in Table III.

TABLE III

As-Made SSZ-36

| 2 Theta | d (Å) | I/Io × 100 |
|---|---|---|
| 8.58 | 10.29 | 55 |
| 9.04 | 9.77 | 55 |
| 10.10 | 8.75 | 24 |
| 11.07 | 7.98 | 1 |
| 13.59 | 6.51 | 4 |
| 15.85 | 5.59 | 9 |
| 16.51 | 5.37 | 2 |
| 16.98 | 5.22 | 17 |
| 17.25 | 5.14 | 1 |
| 18.30 | 4.85 | 100 |
| 18.92 | 4.69 | 8 |
| 19.53 | 4.54 | 18 |
| 20.15 | 4.40 | 26 |
| 20.31 | 4.37 | 13 |
| 20.51 | 4.33 | 21 |
| 20.86 | 4.26 | 23 |
| 22.29 | 3.99 | 13 |
| 22.93 | 3.88 | 4 |
| 23.99 | 3.71 | 7 |
| 24.23 | 3.67 | 21 |
| 24.55 | 3.62 | 19 |
| 25.00 | 3.56 | 10 |
| 25.24 | 3.53 | 45 |
| 25.71 | 3.46 | 2 |
| 25.95 | 3.43 | 1 |
| 26.95 | 3.31 | 1 |

TABLE III-continued

As-Made SSZ-36

| 2 Theta | d (Å) | I/Io × 100 |
|---|---|---|
| 27.32 | 3.26 | 11 |
| 27.64 | 3.22 | 3 |
| 28.06 | 3.18 | 2 |
| 28.45 | 3.14 | 8 |
| 28.81 | 3.10 | 7 |
| 30.71 | 2.91 | 14 |
| 31.06 | 2.88 | 3 |
| 31.36 | 2.85 | 8 |
| 31.90 | 2.80 | 10 |
| 32.60 | 2.74 | 2 |
| 33.24 | 2.69 | 8 |

Example 4

11.14 Grams of Template B solution (0.72M) is used to dissolve 0.197 gram of sodium tetraborate decahydrate. 3.3 Ml of water is added. The silica source was provided as Tosoh 390-HUA, highly dealuminated Y zeolite (1.80 grams). This provides a high surface area silica source with $SiO_2/Al_2O_3=350$, so that a small amount of strong acid aluminum sites are generated in the borosilicate SSZ-36. 0.048 Gram of seed zeolite SSZ-36 is added. The reaction is carried out for 6 days at 160° C. without stirring. The product is well-crystallized SSZ-36.

Examples 5–15

The following examples use the templates described in Table C above and use the same ratios of reactants as shown already in Examples 1–4. The relevant template and Example number are given in Table D, below. In all Examples, the product is crystalline SSZ-36.

TABLE D

| Example No. | Template Code | Example Type |
|---|---|---|
| 5 | C | 3 |
| 6 | D | 3 |
| 7 | E | 3 |
| 8 | F | 3 |
| 9 | F | 2 |
| 10 | G | 3 |
| 11 | H | 3 |
| 12 | I | 3 |
| 13 | J | 3 |
| 14 | K | 3 |
| 15 | L | 3 |

Example 16

The product of Example 3 is calcined in a mixture of nitrogen gas and a minor inlet of air, the combination running through a muffle furnace at 20 SCFM flow rate. The temperature programming in the furnace is as follows:

2° F/min. to 250° F.
Hold for 2 hours
2° F./min. to 1000° F.
Hold for 4 hours
2° F./min. to 1100° F.
Hold for 4 hours
Bring down to room temperature The X-ray diffraction data for the calcined product is given in Table IV.

TABLE IV

| 2 Theta | d (Å) | I/Io × 100 |
|---|---|---|
| 8.58 | 10.30 | 92 |
| 9.02 | 9.80 | 100 |
| 10.08 | 8.77 | 69 |
| 11.02 | 8.02 | 10 |
| 12.46 | 7.10 | 3 |
| 13.52 | 6.54 | 1 |
| 15.82 | 5.60 | 6 |
| 16.92 | 5.24 | 18 |
| 17.28 | 5.13 | 2 |
| 18.26 | 4.86 | 95 |
| 18.87 | 4.70 | 10 |
| 19.51 | 4.55 | 17 |
| 20.11 | 4.41 | 23 |
| 20.27 | 4.38 | 14 |
| 20.44 | 4.34 | 18 |
| 20.80 | 4.27 | 12 |
| 22.22 | 3.99 | 18 |
| 22.86 | 3.89 | 3 |
| 23.96 (SH) | 3.71 | 6 |
| 24.16 | 3.68 | 30 |
| 24.46 | 3.64 | 23 |
| 24.90 (SH) | 3.57 | 14 |
| 25.18 | 3.53 | 56 |
| 25.70 | 3.46 | 4 |
| 26.84 | 3.32 | 1 |
| 27.28 | 3.27 | 18 |
| 27.58 | 3.23 | 5 |
| 27.96 | 3.19 | 2 |
| 28.36 | 3.15 | 8 |
| 28.75 | 3.10 | 7 |
| 29.24 | 3.05 | 1 |
| 30.62 | 2.92 | 18 |
| 30.96 | 2.89 | 5 |
| 31.26 | 2.86 | 11 |
| 31.86 | 2.81 | 12 |
| 32.52 | 2.75 | 4 |
| 33.16 | 2.70 | 10 |

Example 17

The product of Example 16 is measured for micropore volume and surface area, using nitrogen. The micropore volume is found to be 0.22 cc/gm indicating a very open and highly porous molecular sieve. Surface area is greater than 500 $m^2$/gm.

Example 18

The product of Example 2 is calcined as in Example 16. Next, the calcined SSZ-36 is given three subsequent ion-exchange treatments. Each treatment consists of using at least 10 ml/gm zeolite of a 1N $NH_4NO_3$ solution, the mixture being heated to 90–100° C. for 2 hours in each exchange. After the third exchange, the product is washed and dried. The solids are pelleted and meshed to 20–40, dried in air to 900° F., and then loaded into a stainless steel reactor. A Constraint Index reaction was carried for the determination of cracking activity and selectivity as follows:

A Lindburg furnace is used to heat the reactor tube. Helium is introduced into the reactor at 10 cc/in, running at atmospheric pressure. After heating to 700° F., a feed consisting of 50/50 wt % ratio n-hexane/3-methylpentane is delivered into the reactor via a Brownlee pump. The feed rate is 8 microliters/min. yielding a liquid, weight hourly space velocity (LHSV) of 0.68. Direct sampling from the reactor effluent to an on-line chromatograph is begun at 10 minutes. The first data indicates a 45% feed conversion and a C.I. value of 1.0, indicating that SSZ-36 is more constrained than traditional large pore zeolites such as Y.

Example 19

The same steps as those described in Example 18 are taken to synthesize, calcine and ion-exchange SSZ-36 zeolite. In this catalyst test, the conversion of methanol to higher hydrocarbons is studied. The same reactor configuration and drying steps are used as in Example 18. The carrier gas is nitrogen, at 10 cc/min. Using a syringe pump, the feed rate is 1.31 cc/hr. of pure methanol. The reaction is carried out at 750° F. and the conversion is 100% for the first several hours. The product groups observed are shown in Table E below for 4 hours on-stream.

TABLE E

| Product | Area % |
|---|---|
| $C_1$ | 1 |
| $C_2$ | 25 |
| $C_3$ | 55 |
| $C_4$ olefins | 15 |
| $C_5$ olefins | 1 |
| $C_4$–$C_6$ other | 3 |
| Aromatics | None detected |

Example 20

SSZ-36 can be synthesized as an aluminosilicate using an aluminum-rich zeolite source. 0.31 Grams of Na-Y zeolite is used to supply the aluminum source. 2.7 Millimoles of Template M and 1.7 millimoles of NaOH are combined in a 9 ml solution. 0.97 Grams of Cabosil M-5 are added last and the reaction mixture is heated at 160° C. and at 43 RPM until a settled crystalline product is obtained, at about 4 weeks of reaction. The X-ray diffraction pattern of the product matches that for SSZ-36.

What is claimed is:

1. A zeolite having a composition, as synthesized and in the anhydrous state, in terms of mole ratios as follows:

| | |
|---|---|
| $YO_2/W_cO_d$ | 15–100 |
| $M_{2/n}YO_2$ | 0.01–0.10 |
| $Q/YO_2$ | 0.02–0.08 | wherein Y is silicon, germanium or a mixture thereof; W is aluminum, gallium, iron, boron, titanium, indium, vanadium or mixtures thereof; c is 1 or 2; d is 2 when c is 1 or d is 3 or 5 when c is 2 ; M is an alkali metal cation, alkaline earth metal cation or mixtures thereof; n is the valence of M; and Q is at least one cyclic or polycyclic quaternary ammonium cation having the following structure:

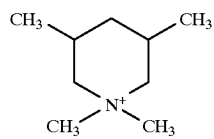

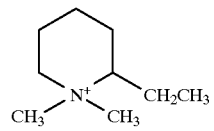

-continued

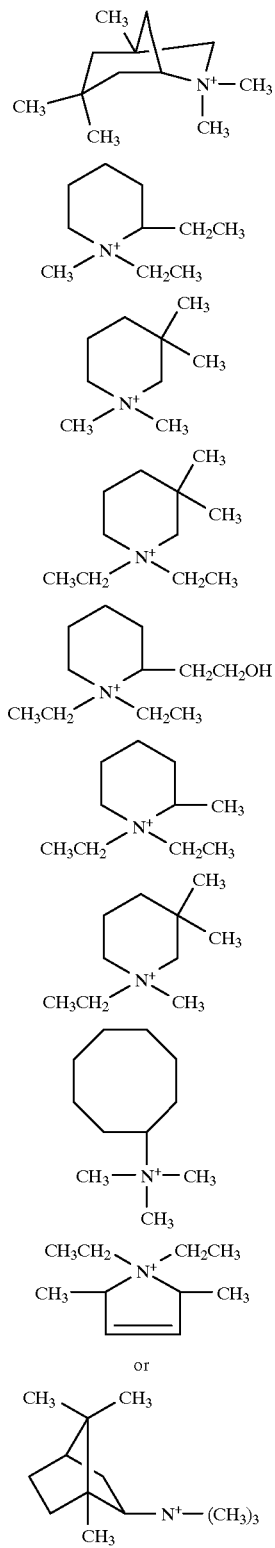

wherein the as-synthesized zeolite has the X-ray diffraction lines of Table I.

2. A zeolite according to claim 1 wherein W is aluminum and Y is silicon.

3. A zeolite according to claim 1 wherein W is boron and Y is silicon.

4. A method of preparing a crystalline material comprising an oxide of a first tetravalent element and an oxide of a second tetravalent element which is different from said first tetravalent element, trivalent element, pentavalent element or mixture thereof and having, after calcination, the X-ray diffraction lines of Table II, said method comprising contacting under crystallization conditions sources of said oxides and a templating agent comprising a cyclic or polycyclic quaternary ammonium cation having the following structure:

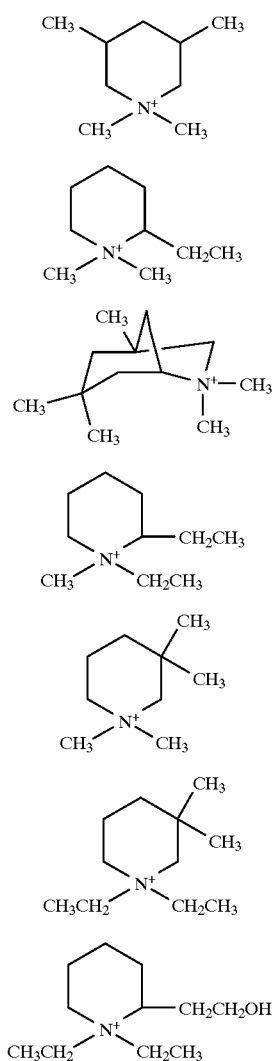

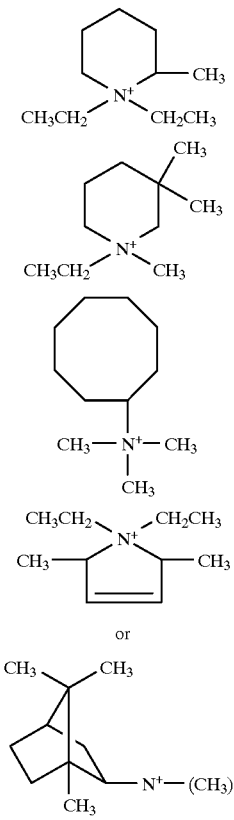

5. The method according to claim 4 wherein the first tetravalent element is selected from the group consisting of silicon, germanium and combinations thereof.

6. The method according to claim 4 wherein the second tetravalent element, trivalent element or pentavalent element is selected from the group consisting of aluminum, gallium, iron, boron, titanium, indium, vanadium and combinations thereof.

7. The method according to claim 6 wherein the second tetravalent element or trivalent element is selected from the group consisting of aluminum, boron, titanium and combinations thereof.

8. The method according to claim 7 wherein the first tetravalent element is silicon.

* * * * *